(12) United States Patent
Shah et al.

(10) Patent No.: US 12,729,279 B2
(45) Date of Patent: Sep. 8, 2026

(54) PREPARATION OF FOAMED SILICONE ELASTOMERS

(71) Applicants: DOW GLOBAL TECHNOLOGIES LLC, Midland, MI (US); DOW SILICONES CORPORATION, Midland, MI (US)

(72) Inventors: Andrew B. Shah, Collegeville, PA (US); Douglas A. Brune, Midland, MI (US); Jody J. Henning, Midland, MI (US); Nicholas A. Paulik, Midland, MI (US); Mark F. Sonnenschein, Midland, MI (US); Jarred Q. Cramton, Denver, CO (US); Mark Fisher, Midland, MI (US); Greg Becker, Auburn, MI (US); Chris Windiate, Midland, MI (US); David Shawl, Midland, MI (US); David R. Schlader, Midland, MI (US); Eric J. Hukkanen, Andover, MA (US)

(73) Assignees: DOW GLOBAL TECHNOLOGIES LLC, Midland, MI (US); DOW SILICONES CORPORATION, Midland, MI (US)

( * ) Notice: Subject to any disclaimer, the term of this patent is extended or adjusted under 35 U.S.C. 154(b) by 886 days.

(21) Appl. No.: 17/796,998

(22) PCT Filed: Feb. 3, 2021

(86) PCT No.: PCT/US2021/016279

§ 371 (c)(1),
(2) Date: Aug. 2, 2022

(87) PCT Pub. No.: WO2021/158579

PCT Pub. Date: Aug. 12, 2021

(65) Prior Publication Data

US 2023/0073487 A1 Mar. 9, 2023

Related U.S. Application Data

(60) Provisional application No. 62/970,382, filed on Feb. 5, 2020.

(51) Int. Cl.
*C08J 9/14* (2006.01)
*B29B 7/74* (2006.01)
(Continued)

(52) U.S. Cl.
CPC ............ *C08J 9/146* (2013.01); *B29B 7/7404* (2013.01); *B29B 7/749* (2013.01);
(Continued)

(58) Field of Classification Search
CPC .......... B29B 7/74–7433; B29B 7/7404; B29B 7/749; B29B 7/325; C08J 9/12–149;
(Continued)

(56) References Cited

U.S. PATENT DOCUMENTS 3,419,593 A 12/1968 Willing
3,715,334 A 2/1973 Karstedt
(Continued)

FOREIGN PATENT DOCUMENTS

CA 2647972 A1 6/2010
CN 108129692 A * 6/2018 ............. C08J 9/122
(Continued)

OTHER PUBLICATIONS

Williams, D.J. et al. Update on the Development of HFC-245fa as a Liquid HFC Blowing Agent. Journal of Cellular Plastics vol. 33. 1997. pp. 238-263. (Year: 1997).*
(Continued)

*Primary Examiner* — Christina H.W. Rosebach
(74) *Attorney, Agent, or Firm* — Warner Norcross + Judd LLP

(57) ABSTRACT

This disclosure relates to continuous methods of making foamed silicone elastomers. This disclosure also relates to
(Continued)

compositions used for forming foamed silicone elastomers. The compositions comprise: (i) an organopolysiloxane having at least two silicon-bonded unsaturated groups per molecule; (ii) an organohydrogensiloxane having at least two silicon-bonded hydrogen atoms per molecule; (iii) a hydrosilylation catalyst; and (iv) a physical blowing agent. Foamed silicone elastomers can be prepared from such compositions, using, for example, the methods disclosed herein.

18 Claims, 3 Drawing Sheets

(51) Int. Cl.

| | |
|---|---|
| ***B29C 44/34*** | (2006.01) |
| ***C08G 77/12*** | (2006.01) |
| ***C08G 77/20*** | (2006.01) |
| ***C08L 83/04*** | (2006.01) |
| *B29B 7/32* | (2006.01) |

(52) U.S. Cl.

CPC .......... *B29C 44/3442* (2013.01); *C08G 77/12* (2013.01); *C08G 77/20* (2013.01); *C08L 83/04* (2013.01); *B29B 7/325* (2013.01); *C08J 2201/022* (2013.01); *C08J 2203/142* (2013.01); *C08J 2383/05* (2013.01); *C08J 2383/07* (2013.01); *C08J 2483/05* (2013.01)

(58) Field of Classification Search

CPC ...... C08J 9/146; C08J 9/143; C08J 2201/022; C08J 2203/142; C08J 2383/05; C08J 2383/07; C08J 2483/05; B29C 44/3442; C08G 77/12; C08G 77/20; C08L 83/04

See application file for complete search history.

(56) References Cited

U.S. PATENT DOCUMENTS

| | | | | |
|---|---|---|---|---|
| 3,814,730 | A | 6/1974 | Karstedt | |
| 4,929,669 | A * | 5/1990 | Jensen | C08K 5/14 524/588 |
| 5,436,274 | A | 7/1995 | Sumpter et al. | |
| 5,574,073 | A * | 11/1996 | Juen | C08J 9/02 521/154 |
| 5,744,507 | A | 4/1998 | Angell et al. | |
| 6,605,734 | B2 | 8/2003 | Roy et al. | |
| 7,263,810 | B1 | 9/2007 | Trauba | |
| 12,128,440 | B2 | 10/2024 | Chuiko et al. | |
| 2006/0040116 | A1 * | 2/2006 | Ikeno | C08L 83/04 428/447 |
| 2006/0235094 | A1 * | 10/2006 | Habibi-Naini | B29C 44/3446 521/50 |
| 2007/0160768 | A1 | 7/2007 | Ohnstad et al. | |
| 2017/0080614 | A1 | 3/2017 | Lamm | |
| 2018/0043584 | A1 | 2/2018 | Feng et al. | |
| 2018/0223069 | A1 * | 8/2018 | O'Neil | C08L 83/04 |
| 2022/0226859 | A1 | 7/2022 | Chuiko et al. | |

FOREIGN PATENT DOCUMENTS

| | | | |
|---|---|---|---|
| EP | 0691365 | A1 | 1/1996 |
| GB | 2319316 | A | 5/1998 |
| WO | 2020028299 | A1 | 2/2020 |
| WO | 2020132013 | A1 | 6/2020 |
| WO | 2020132020 | A1 | 6/2020 |
| WO | 2020132028 | A1 | 6/2020 |
| WO | 2021168041 | A1 | 8/2021 |

OTHER PUBLICATIONS

Machine translation of CN 108129692 by Huang et al. (Year: 2018).*

"Silicones" by Butts et al. In "Encyclopedia of Polymer Science and Technology" 2002 John Wiley and Sons. https://doi.org/10.1002/0471440264.pst338 (Year: 2003).*

International Search Report for PCT/US2021/016279 dated May 4, 2021, 2 pages.

Machine assisted English translation of EP0691365 obtained from https://patents.google.com/patent on Nov. 29, 2022, 12 pages.

* cited by examiner

PREPARATION OF FOAMED SILICONE ELASTOMERS

CROSS-REFERENCE TO RELATED APPLICATIONS

This application is the U.S. National Stage of International Application No. PCT/US2021/016279 filed on 3 Feb. 2021, which claims priority to and all advantages of U.S. Provisional Patent Application No. 62/970,382 filed on 5 Feb. 2020, the content of which is incorporated herein by reference.

FIELD OF THE INVENTION

This disclosure relates to continuous methods of making foamed silicone elastomers, compositions used for forming foamed silicone elastomers in said methods, and the resulting foamed silicone elastomers formed from such compositions. The methods described are continuous methods utilizing physical foaming agents.

BACKGROUND OF THE INVENTION

Room temperature vulcanization (RTV) silicone foams are almost exclusively chemically blown using the dehydrocondensation reaction between silicone hydride and hydroxyl-functional components. Specifically, hydrogen gas is generated via reaction of Si—H and Si—OH groups, which foams the RTV reaction mixture.

In some cases, however, generation of hydrogen gas can be problematic due to flammability concerns. For example, the presence of hydrogen gas at concentrations between the lower and upper explosion limits (LEL and UEL) in an environment where sparks or high heat could be present is hazardous.

An alternate blowing mechanism to form silicone foams involves the application of heat to facilitate foaming. In some situations, heating to foam and cure the silicone polymer composition is undesirable, and an RTV solution is preferred. This presents the aforementioned hazard potential. While hydrogen gas generation may not always be problematic, conventional blowing mechanisms (such as hydrogen blown RTV silicone foams) do not have desirable physical properties for certain applications.

In view of the foregoing, there remains an opportunity to provide improved methods for forming foamed silicone elastomers and improved foamed silicone elastomers resulting therefrom using compositions containing only physical blowing agents especially as there does not appear to be a continuous process for large scale production of silicone foams using a physical blowing agent, or instructions fora continuous dispensing process methodology.

BRIEF SUMMARY OF THE INVENTION

This disclosure relates to a continuous method for forming a foamed silicone elastomer from a composition (referred to herein as the "composition") comprising i) an organopolysiloxane having at least two silicon-bonded ethylenically unsaturated groups per molecule;
ii) an organohydrogensiloxane having at least two silicon-bonded hydrogen atoms per molecule;
iii) a hydrosilylation catalyst; and
iv) a physical liquid blowing agent;

which method comprises the steps of (a) blending a part A composition comprising components (i) and (iii) and separately blending a part B composition comprising components (i) and (ii); composition;
(b) introducing the part A composition and the Part B composition into respective mixing containers and mixing;
(c) transferring resulting part A and part B mixtures of step (b) into respective pumping means;
(d) pumping the resulting part A and part B mixtures of steps (b) and (c) into a mixer unit and mixing to form a foam; and
(e) dispensing the resulting foam; wherein
(f) Component (iv) is introduced into one or both of the part A composition or the part B composition during step (a) or step (b) and/or is introduced into the static mixer during step (d).

The part A composition does not include any of component (ii) and the part B composition does not include any of component (iii) in order to avoid premature curing and foam formation prior to step (d). Initially upon mixing in step (d) a silicone elastomer composition is generated with foaming taking place as a consequence of the physical liquid blowing agent (iv) vaporising. Vaporisation and the consequent resulting foaming takes place during step (d) or steps (d) and (e), but may not be completed until after step (e).

Hydrosilylation catalyst (iii) is present in a catalytically effective amount. Thus, the composition is generally classified as a hydrosilylation reaction composition, and the foam is cured via hydrosilylation reaction of at least components (i) and (ii). The physical blowing agent (iv) undergoes a phase change from a liquid to a gaseous state during exposure to atmospheric pressure and a temperature greater than or equal to (≥) 0° C. The physical blowing agent alternatively undergoes a phase change from a liquid to a gaseous state during exposure to a reduced pressure and a temperature ≥0° C. During cure, the blowing agent (iv) blows the reaction mixture of the composition to form the foam.

This disclosure also relates to a foamed silicone elastomer (referred to herein as the "foam," "foamed elastomer," or "elastomer"). As alluded to above, the foam comprises the reaction product of the composition. In various embodiments, the foam comprises the reaction product of parts A) and B), formed in the presence of components (iii), and (iv). The reaction product may also be formed in the presence of one or more optional additives. Such additives, if utilized, may be inert to, or reactive with, other components of the composition.

In the composition of this disclosure and relative to conventional foamable RTV silicone compositions that rely on hydrogen gas for foaming all of the hydrogen gas used for blowing is replaced with the physical blowing agent (iv) to form the foam of this disclosure. In various embodiments, component (iv) is classified as a liquid blowing agent (LBA), which undergoes a phase change at the temperature of foam formation or application.

Specifically, it was identified that excluding a majority (to all) of the hydroxyl-functional components of the composition (such as those typically used in RTV silicone systems), and blending in component (iv) produced a foam, at room temperature, with a desirable density, pore size, and pore size distribution. It is thought that the benefit of a substantial reduction in foam density far outweighs a minimal (if not negligible) increase in hydrogen gas generation. This is described in greater detailed further below, and generally illustrated in FIG. 1.

DETAILED DESCRIPTION OF THE INVENTION

As used herein, the term "ambient temperature" or "room temperature" refers to a temperature between about 20° C. and about 30° C. Usually, room temperature ranges from about 20° C. to about 25° C. The term "ambient pressure" or "atmospheric pressure" refers to a pressure of about 101 kPa.

All viscosity measurements referred to herein were measured at 25° C. unless otherwise indicated. Viscosity can be determined via methods understood in the art. The following abbreviations have these meanings herein: "Me" means methyl, "Et" means ethyl, "Pr" means propyl, "Bu" means butyl, "g" means grams, and "ppm" means parts per million.

"Hydrocarbyl" means a monovalent hydrocarbon group which may be substituted or unsubstituted. Specific examples of hydrocarbyl groups include alkyl groups, alkenyl groups, alkynyl groups, aryl groups, aralkyl groups, etc.

"Alkyl" means an acyclic, branched or unbranched, saturated monovalent hydrocarbon group. Alkyl is exemplified by, but not limited to, Me, Et, Pr (e.g. iso-Pr and/or n-Pr), Bu (e.g. iso-Bu, n-Bu, tert-Bu, and/or sec-Bu), pentyl (e.g. iso-pentyl, neo-pentyl, and/or tert-pentyl), hexyl, heptyl, octyl, nonyl, decyl, undecyl, and dodecyl as well as branched saturated monovalent hydrocarbon groups of 6-12 carbon atoms. Alkyl groups may have 1-30, alternatively 1-24, alternatively 1-20, alternatively 1-12, alternatively 1-10, and alternatively 1-6, carbon atoms.

"Alkenyl" means an acyclic, branched or unbranched, monovalent hydrocarbon group having one or more carbon-carbon double bonds. Alkenyl is exemplified by, but not limited to, vinyl, allyl, methallyl, propenyl, and hexenyl. Alkenyl groups may have 2-30, alternatively 2-24, alternatively 2-20, alternatively 2-12, alternatively 2-10, and alternatively 2-6, carbon atoms.

"Alkynyl" means an acyclic, branched or unbranched, monovalent hydrocarbon group having one or more carbon-carbon triple bonds. Alkynyl is exemplified by, but not limited to, ethynyl, propynyl, and butynyl. Alkynyl groups may have 2-30, alternatively 2-24, alternatively 2-20, alternatively 2-12, alternatively 2-10, and alternatively 2-6, carbon atoms.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5-9, alternatively 6-7, and alternatively 5-6, carbon atoms. Polycyclic aryl groups may have 10-17, alternatively 10-14, and alternatively 12-14, carbon atoms.

"Aralkyl" means an alkyl group having a pendant and/or terminal aryl group or an aryl group having a pendant alkyl group. Exemplary aralkyl groups include tolyl, xylyl, mesityl, benzyl, phenylethyl, phenyl propyl, and phenyl butyl.

"Alkenylene" means an acyclic, branched or unbranched, divalent hydrocarbon group having one or more carbon-carbon double bonds. "Alkylene" means an acyclic, branched or unbranched, saturated divalent hydrocarbon group. "Alkynylene" means an acyclic, branched or unbranched, divalent hydrocarbon group having one or more carbon-carbon triple bonds. "Arylene" means a cyclic, fully unsaturated, divalent hydrocarbon group.

"Carbocycle" and "carbocyclic" each mean a hydrocarbon ring. Carbocycles may be monocyclic or alternatively may be fused, bridged, or spiro polycyclic rings. Monocyclic carbocycles may have 3-9, alternatively 4-7, and alternatively 5-6, carbon atoms. Polycyclic carbocycles may have 7-17, alternatively 7-14, and alternatively 9-10, carbon atoms. Carbocycles may be saturated or partially unsaturated.

"Cycloalkyl" means a saturated carbocycle. Monocyclic cycloalkyl groups are exemplified by cyclobutyl, cyclopentyl, and cyclohexyl. "Cycloalkylene" means a divalent saturated carbocycle.

The term "substituted" as used in relation to another group, e.g. a hydrocarbyl group, means, unless indicated otherwise, one or more hydrogen atoms in the hydrocarbyl group has been replaced with another substituent. Examples of such substituents include, for example, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

M, D, T and Q units are generally represented as $R_uSiO_{(4-u)/2}$, where u is 3, 2, 1, and 0 for M, D, T, and Q, respectively, and R is an independently selected hydrocarbyl group. The M, D, T, Q designate one (Mono), two (Di), three (Tri), or four (Quad) oxygen atoms covalently bonded to a silicon atom that is linked into the rest of the molecular structure.

Component (i)

Component (i) is an organopolysiloxane having at least two silicon-bonded ethylenically unsaturated groups per molecule. Component (i) may be any unsaturated organopolysiloxane based compound having at least two aliphatically unsaturated groups. In various embodiments, component (i) has at least three silicon-bonded ethylenically unsaturated groups per molecule. In certain embodiments, component (i) comprises a siloxane. In other embodiments, component (i) comprises a silicone-organic hybrid. Various embodiments and examples of component (i) are disclosed below.

The aliphatically unsaturated groups of component (i) may be terminal, pendent, or in both locations in component (i). For example, the aliphatically unsaturated group may be an alkenyl group and/or an alkynyl group. Alkenyl groups are exemplified by, but not limited to, vinyl, allyl, propenyl, and hexenyl. Alkynyl is exemplified by, but not limited to, ethynyl, propynyl, and butynyl.

In certain embodiments, component (i) comprises an organopolysiloxane having multiple repeating groups of the following average formula:

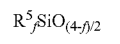

$$R^5_fSiO_{(4-f)/2}$$

wherein each $R^5$ is an independently selected substituted or unsubstituted hydrocarbyl group with the proviso that in each molecule, at least two $R^5$ groups are aliphatically unsaturated groups, and wherein f is selected such that 0 is less than f which is less than or equal to 3.2, i.e. $0<f\leq3.2$.

The average formula above for the organopolysiloxane may be alternatively written in the form of a molar fraction as

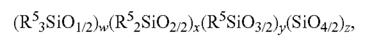

$$(R^5_3SiO_{1/2})_w(R^5_2SiO_{2/2})_x(R^5SiO_{3/2})_y(SiO_{4/2})_z,$$

where $R^5$ and its proviso is defined above, and w, x, y, and z are independently from greater or equal to zero to less than or equal to 1, i.e. ≥0 to ≤1, with the proviso that w+x+y+z=1. One of skill in the art understands how such M, D, T, and Q units and their molar fractions influence subscript fin the average formula above. T and Q units, indicated by subscripts y and z, are typically present in silicone resins, whereas D units, indicated by subscript x, are typically present in silicone polymers (and may also be present in silicone resins).

Each $R^5$ is independently selected, as introduced above, and may be linear, branched, cyclic, or combinations thereof. Cyclic hydrocarbyl groups encompass aryl groups as well as saturated or non-conjugated cyclic groups. Aryl groups may be monocyclic or polycyclic. Linear and branched hydrocarbyl groups may independently be saturated or unsaturated. One example of a combination of a linear and cyclic hydrocarbyl group is an aralkyl group. Examples of substituted and unsubstituted hydrocarbyl groups are introduced above relative to R. Examples of aliphatically unsaturated group(s) are also introduced above.

In certain embodiments, the organopolysiloxane is substantially linear, alternatively is linear. In these embodiments, the substantially linear organopolysiloxane may have the average formula:

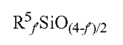

wherein each $R^5$ and its proviso are defined above, and wherein f' is selected such that 1.9 is less than or equal to f' which is less than or equal to 2.2, i.e. 1.9≤f'≤2.2 and having terminal groups of the structure $R^5_3SiO_{1/2}$.

In these embodiments, at a temperature of 25° C., the substantially linear organopolysiloxane is typically a flowable liquid or is in the form of an uncured siloxane gum. Generally, the substantially linear organopolysiloxane has a viscosity of from 10 to 30,000,000 mPa·s, alternatively from 10 to 10,000,000 mPa·s, alternatively from 100 to 1,000,000 mPa·s, alternatively from 100 to 100,000 mPa·s, at 25° C. Viscosity may be measured at 25° C. via a Brookfield LV DV-E viscometer, as understood in the art. However, because of the difficulty in measuring viscosity of highly viscous fluids such as silicone gums, the gums may alternatively be described by way of their Williams plasticity values in accordance with ASTM D-926-08 rather than by viscosity. A polydiorganosiloxane gum (i) has a viscosity resulting in a Williams's plasticity of at least 30 mm/100 measured in accordance with ASTM D-926-08, alternatively at least 50 mm/100 measured in accordance with ASTM D-926-08, alternatively at least 100 mm/100 measured in accordance with ASTM D-926-08, alternatively from 100 mm/100 to 300 mm/100.

In specific embodiments in which the organopolysiloxane is substantially linear or linear, the organopolysiloxane may have the average formula:

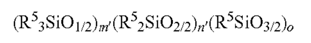

wherein each $R^5$ is independently selected and defined above (including the proviso that in each molecule, at least two $R^5$ groups are aliphatically unsaturated groups), and m'≥2, n'≥2, and o≥0. In specific embodiments, m' is from 2 to 10, alternatively from 2 to 8, alternatively from 2 to 6. In these or other embodiments, n' is from 2 to 1,000, alternatively from 2 to 500, alternatively from 2 to 200. In these or other embodiments, o is from 0 to 500, alternatively from 0 to 200, alternatively from 0 to 100.

When the organopolysiloxane is substantially linear, alternatively is linear, the silicon-bonded aliphatically unsaturated groups may be pendent, terminal or in both pendent and terminal locations. As a specific example of the organopolysiloxane having pendant silicon-bonded aliphatically unsaturated groups, the organopolysiloxane may have the average formula:

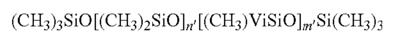

where n' and m' are defined above, and Vi indicates a vinyl group. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Alternatively, as a specific example of the organopolysiloxane having terminal silicon-bonded aliphatically unsaturated groups, the organopolysiloxane may have the average formula:

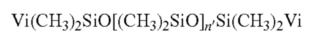

where n' and Vi are defined above. The dimethyl polysiloxane terminated with silicon-bonded vinyl groups may be utilized alone or in combination with the dimethyl, methylvinyl polysiloxane disclosed immediately above. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Because the at least two silicon-bonded aliphatically unsaturated groups may be both pendent and terminal, component (i) may have the average formula:

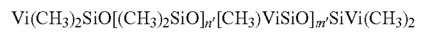

where n', m' and Vi are defined above.

The substantially linear organopolysiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

In these or other embodiments, component (i) may be a resinous organopolysiloxane. In these embodiments, the resinous organopolysiloxane may have the average formula:

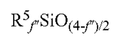

wherein each $R^5$ and its provisos are defined above, and wherein f" is selected such that $0.5 \leq f" \leq 1.7$.

The resinous organopolysiloxane has a branched or a three dimensional network molecular structure. At 25° C., the resinous organopolysiloxane may be in a liquid or in a solid form, optionally dispersed in a carrier, which may solubilize and/or disperse the resinous organopolysiloxane therein.

In specific embodiments, the resinous organopolysiloxane may be exemplified by an organopolysiloxane that comprises only T units, an organopolysiloxane that comprises T units in combination with other siloxy units (e.g. M, D, and/or Q siloxy units), or an organopolysiloxane comprising Q units in combination with other siloxy units (i.e., M, D, and/or T siloxy units). Typically, the resinous organopolysiloxane comprises T and/or Q units. A specific example of the resinous organopolysiloxane is a vinyl-terminated silsesquioxane.

The organopolysiloxane may comprise a combination or mixture of different organopolysiloxanes, including those of different structures. In certain embodiments, component (i) comprises one or more linear organopolysiloxanes as a majority component.

Component (ii)

Component (ii) includes at least two silicon-bonded hydrogen atoms per molecule. In various embodiments, component (ii) has at least three silicon-bonded hydrogen atoms per molecule. Component (ii) can be linear, branched, cyclic, resinous, or have a combination of such structures. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms.

In certain embodiments, component (ii) is of formula $R^8_{4-s}SiH_s$, where $R^8$ is independently selected and may be any silicon-bonded group, and s is selected such that $1 \leq s \leq 4$. Typically, s is 1, 2, or 3, alternatively 1 or 2. Each $R^8$ is typically independently a substituted or unsubstituted hydrocarbyl group. However, $R^8$ can be any silicon-bonded group so long as component (ii) is still capable of undergoing hydrosilylation via its silicon-bonded hydrogen atoms. For example, $R^8$ can be a halogen. When component (ii) is a silane compound, component (ii) can be a monosilane, disilane, trisilane, or polysilane.

In these or other embodiments, component (ii) may be an organosilicon compound of formula: $H_{g'}R^9_{3-g'}Si—R^{10}—SiR^9_2H$, wherein each $R^9$ is an independently selected substituted or unsubstituted hydrocarbyl group, g' is 0 or 1, and $R^{10}$ is a divalent linking group. $R^{10}$ may be a siloxane chain (including, for example, $—R^9_2SiO—$, $—R^9HSiO—$, and/or $—H_2SiO—$ D siloxy units) or may be a divalent hydrocarbon group. Typically, the divalent hydrocarbon group is free of aliphatic unsaturation. The divalent hydrocarbon group may be linear, cyclic, branched, aromatic, etc., or may have combinations of such structures.

In these or other embodiments, component (ii) comprises an organohydrogensiloxane, which can be a disiloxane, trisiloxane, or polysiloxane. Examples of organohydrogensiloxanes suitable for use as component (ii) include, but are not limited to, siloxanes having the following formulae: $PhSi(OSiMe_2H)_3$, $Si(OSiMe_2H)_4$, $MeSi(OSiMe_2H)_3$, and $Ph_2Si(OSiMe_2H)_2$, wherein Me is methyl, and Ph is phenyl.

Additional examples of organohydrogensiloxanes that are suitable for purposes of component (ii) include 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), and a dimethylhydrogensiloxy-terminated poly(methylhydrogensiloxane).

When component (ii) comprises an organohydrogensiloxane, component (ii) may comprise any combination of M, D, T and/or Q siloxy units, so long as component (ii) includes at least two silicon-bonded hydrogen atoms. These siloxy units can be combined in various manners to form cyclic, linear, branched and/or resinous (three-dimensional networked) structures. Component (ii) may be monomeric, polymeric, oligomeric, linear, branched, cyclic, and/or resinous depending on the selection of M, D, T, and/or Q units.

Because component (ii) includes at least two silicon-bonded hydrogen atoms, with reference to the siloxy units set forth above, component (ii) may comprise any of the following siloxy units including silicon-bonded hydrogen atoms, optionally in combination with siloxy units which do not include any silicon-bonded hydrogen atoms: $(R^9_2HSiO_{1/2})$, $(R^9H_2SiO_{1/2})$, $(H_3SiO_{1/2})$, $(R^9HSiO_{2/2})$, $(H_2SiO_{2/2})$, and/or $(HSiO_{3/2})$, where $R^9$ is independently selected and defined above.

In specific embodiments, for example when component (ii) is linear, component (ii) may have the average formula:

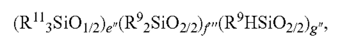

wherein each $R^{11}$ is independently hydrogen or $R^9$, each $R^9$ is independently selected and defined above, and $e" \geq 2$, $f''' \geq 0$, and $g" \geq 2$. In specific embodiments, e" is from 2 to 10, alternatively from 2 to 8, alternatively from 2 to 6. In these or other embodiments, f''' is from 0 to 1,000, alternatively from 1 to 500, alternatively from 1 to 200. In these or other embodiments, g" is from 2 to 500, alternatively from 2 to 200, alternatively from 2 to 100.

In one embodiment, component (ii) is linear and includes two or more pendent silicon-bonded hydrogen atoms. In these embodiments, component (ii) may be a dimethyl, methyl-hydrogen polysiloxane having the average formula;

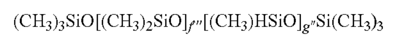

where f''' and g" are defined above.

In these or other embodiments, component (ii) is linear and includes terminal silicon-bonded hydrogen atoms. In these embodiments, component (ii) may be an SiH terminal dimethyl polysiloxane having the average formula:

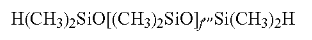

where f''' is as defined above. The SiH terminal dimethyl polysiloxane may be utilized alone or in combination with the dimethyl, methyl-hydrogen polysiloxane disclosed immediately above. Further, the SiH terminal dimethyl polysiloxane may have one trimethylsiloxy terminal such that the SiH terminal dimethyl polysiloxane may have only one silicon-bonded hydrogen atom. Alternatively, component (ii) may include both pendent and terminal silicon-bonded hydrogen atoms.

In these embodiments, at a temperature of 25° C., the substantially linear organohydrogenpolysiloxane is typically a flowable liquid or is in the form of an uncured rubber. Generally, the substantially linear organohydrogenpolysiloxane has a viscosity of from 10 to 30,000,000 mPa·s, alternatively from 10 to 10,000,000 mPa·s, alternatively from 100 to 1,000,000 mPa·s, alternatively from 100 to 100,000 mPa·s, at 25° C. Viscosity may be measured at 25° C. via a Brookfield LV DV-E viscometer, as understood in the art. As discussed above high viscosity gums may be defined in terms of their Williams plasticity values as opposed to by way of viscosity.

In certain embodiments, component (ii) may have one of the following average formulas:

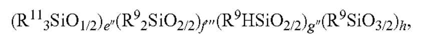

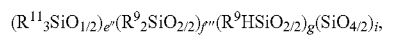

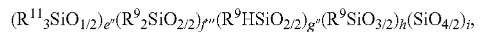

wherein each $R^{11}$ and $R^9$ is independently selected and defined above, e'', f''', and g'' are defined above, and h≥0, and i is ≥0.

Some of the average formulas above for component (ii) are resinous when component (ii) includes T siloxy units (indicated by subscript h) and/or Q siloxy units (indicated by subscript i). When component (ii) is resinous, component (ii) is typically a copolymer including T siloxy units and/or Q siloxy units, in combination with M siloxy units and/or D siloxy units. For example, the organohydrogenpolysiloxane resin can be a DT resin, an MT resin, an MDT resin, a DTQ resin, an MTQ resin, an MDTQ resin, a DQ resin, an MQ resin, a DTQ resin, an MTQ resin, or an MDQ resin.

In various embodiments in which component (ii) is resinous, or comprises an organopolysiloxane resin, component (ii) typically has the formula:

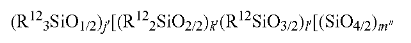

wherein each $R^{12}$ independently is H or a substituted or unsubstituted hydrocarbyl group, with the proviso that in one molecule, at least one $R^{12}$ is H; and wherein $0 \leq j' \leq 1$; $0 \leq k' \leq 1$; $0 \leq l' \leq 1$; and $0 \leq m'' \leq 1$; with the proviso that $j'+k'+l'+m''=1$.

In certain embodiments, component (ii) may comprise an alkylhydrogen cyclosiloxane or an alkylhydrogen dialkyl cyclosiloxane copolymer, represented in general by the formula $(R^{12}{}_2SiO)_{r'}(R^{12}HSiO)_{s'}$, where $R^{12}$ is independently selected and defined above, and where r' is an integer from 0-7 and s' is an integer from 3-10. Specific examples of suitable organohydrogensiloxanes of this type include $(OSiMeH)_4$, $(OSiMeH)_3(OSiMeC_6H_{13})$, $(OSiMeH)_2(OSiMeC_6H_{13})_2$, and $(OSiMeH)(OSiMeC_6H_{13})_3$, where Me represents methyl ($-CH_3$). Component (ii) can be a single silicon hydride compound or a combination comprising two or more different silicon hydride compounds.

The composition may comprise components (i) and (ii) in varying amounts or ratios contingent on desired properties of the composition and foams formed therefrom. In various embodiments, the composition comprises components (i) and (ii) in an amount to provide a mole ratio of silicon-bonded hydrogen atoms to aliphatically unsaturated groups of from 0.3:1 to 5:1, alternatively from 0.6:1 to 3:1.

Component (iii)

The hydrosilylation (or addition) reaction, e.g. between Si—H and ethylenically unsaturated groups, takes place in the presence of the hydrosilylation catalyst (hereinafter the "catalyst"). The catalyst may be conventional to the art. For example, the catalyst may be a platinum group metal-containing catalyst. By "platinum group" it is meant ruthenium, rhodium, palladium, osmium, iridium and platinum and complexes thereof.

The catalyst can be platinum metal, platinum metal deposited on a carrier, such as silica gel or powdered charcoal, or a compound or complex of a platinum group metal. Typical catalysts include chloroplatinic acid, either in hexahydrate form or anhydrous form, and/or a platinum-containing catalyst which is obtained by a method comprising reacting chloroplatinic acid with an aliphatically unsaturated organosilicon compound, such as divinyltetramethyldisiloxane, or alkene-platinum-silyl complexes as described in U.S. Pat. No. 6,605,734. An example is: $(COD)Pt(SiMeCl_2)_2$ where "COD" is 1,5-cyclooctadiene. These alkene-platinum-silyl complexes may be prepared, e.g. by mixing 0.015 mole $(COD)PtCl_2$ with 0.045 mole COD and 0.0612 moles $HMeSiCl_2$.

One suitable platinum catalyst type is Karstedt's catalyst, which is described in Karstedt's U.S. Pat. Nos. 3,715,334 and 3,814,730. Karstedt's catalyst is a platinum divinyl tetramethyl disiloxane complex typically containing about 1 wt. % of platinum in a solvent, such as toluene. Another suitable platinum catalyst type is a reaction product of chloroplatinic acid and an organosilicon compound containing terminal aliphatic unsaturation (described in U.S. Pat. No. 3,419,593).

The catalyst is present in the composition in a catalytic amount, i.e., an amount or quantity sufficient to promote a reaction or curing thereof at desired conditions. Varying levels of the catalyst can be used to tailor reaction rate and cure kinetics. The catalytic amount of the catalyst may be greater than 0.01 ppm, and may be greater than 1,000 ppm (e.g., up to 10,000 ppm or more). In certain embodiments, the catalytic amount of catalyst is less than 5,000 ppm, alternatively less than 2,000 ppm, and alternatively less than 1,000 ppm (but in any case, greater than 0 ppm). In specific embodiments, the catalytic amount of the catalyst may range from 0.01 to 1,000 ppm, alternatively 0.01 to 100 ppm, and alternatively 0.01 to 50 ppm, of metal based on the weight of the composition. The ranges may relate solely to the metal content within the catalyst or to the catalyst altogether (including its ligands). In certain embodiments, these ranges relate solely to the metal content within the catalyst. The catalyst may be added as a single species or as a mixture of two or more different species.

Component (iv)

Component (iv) is a physical liquid blowing agent. The physical liquid blowing agent is tailored to undergo a phase change at the temperature of application. In the present disclosure the physical blowing agent is the main source for the gas that leads to the formation of the foam by replacing all or most of the hydrogen gas typically used to blow foam. In many embodiments, the reaction between the components (i) and (ii) essentially does not lead to the production of gas that leads to or aids in the formation of the foam.

The physical blowing agent chosen is selected in accordance with its boiling point such that it undergoes a phase change from a liquid to a gaseous state during exposure which is typically at atmospheric pressure but which might alternatively be during exposure to a reduced pressure and the temperature of the cure process, e.g. a temperature ≥10° C., alternatively ≥20° C., alternatively ≥30° C., alternatively ≥40° C., alternatively ≥50° C., alternatively ≥60° C., alternatively ≥70° C., alternatively ≥80° C., alternatively ≥90° C., alternatively ≥100° C. The above may be the sole means of selection but the physical blowing agent may alternatively or additionally be chosen based on its solubility in the part A composition or part B composition in which it is stored and/or the elastomer composition after part A and part B are mixed in step (d). Typically, the better the solubility, the better the foam generated. In the case of room temperature vulcanization systems the physical blowing agent chosen may have a boiling point of between 10 and 30° C., i.e. such that it undergoes a phase change from a liquid to a gaseous state during exposure to atmospheric pressure or, if preferred a reduced pressure within this temperature range but may be at least partially maintained in liquid form during step (d) or steps (d) and (e).

The amount of physical blowing agent utilized can vary depending on the desired outcome. For example, the amount of physical blowing agent can be varied to tailor final foam density and foam rise profile.

Useful physical blowing agents include hydrocarbons, such as pentane, hexane, halogenated, more particularly chlorinated and/or fluorinated, hydrocarbons, for example methylene chloride, chloroform, trichloroethane, chlorofluorocarbons, hydrochlorofluorocarbons (HCFCs), ethers, ketones and esters, for example methyl formate, ethyl formate, methyl acetate or ethyl acetate, in liquid form or air, nitrogen or carbon dioxide as gases. In certain embodiments, the physical blowing agent comprises a compound selected from the group consisting of propane, butane, isobutane, isobutene, isopentane, dimethylether or mixtures thereof. In many embodiments, the blowing agent comprises a compound that is inert.

In various embodiments, the physical blowing agent comprises a hydrofluorocarbon (HFC). "Hydrofluorocarbon" and "HFC" are interchangeable terms and refer to an organic compound containing hydrogen, carbon, and fluorine. The compound is substantially free of halogens other than fluorine.

Examples of suitable HFCs include aliphatic compounds such as 1,1,1,3,3-pentafluoropropane (HFC-245fa), 1,1,1,3,3-pentafluorobutane (HFC-365mfc), 1-fluorobutane, nonafluorocyclopentane, perfluoro-2-methylbutane, 1-fluorohexane, perfluoro-2,3-dimethylbutane, perfluoro-1,2-dimethylcyclobutane, perfluorohexane, perfluoroisohexane, perfluorocyclohexane, perfluoroheptane, perfluoroethylcyclohexane, perfluoro-1,3-dimethyl cyclohexane, and perfluorooctane; as well as aromatic compounds such as fluorobenzene, 1,2-difluorobenzene; 1,4-difluorobenzene, 1,3-difluorobenzene; 1,3,5-trifluorobenzene; 1,2,4,5-tetrafluorobenzene, 1,2,3,5-tetrafluorobenzene, 1,2,3,4-tetrafluorobenzene, pentafluorobenzene, hexafluorobenzene, and 1-fluoro-3-(trifluoromethyl)benzene. In certain embodiments, HFC-365mfc and HFC-245fa may be preferred due to their increasing availability and ease of use, with HFC-365mfc having a higher boiling point than HFC-245fa which may be useful in certain applications. For example, HFCs having a boiling point higher than 30° C., such as HFC-365mfc, may be desirable although they will require more heating in order to vaporize at atmospheric pressure or if preferred a reduced pressure, otherwise, if less of the physical blowing agent is vaporized a denser foam will be generated. In specific embodiments, component (iv) comprises 1,1,1,3,3-pentafluoropropane (HFC-245fa).

The composition herein does not include a chemical blowing agent.

Optional Additive(s)

The composition may optionally further comprise additional ingredients or components (or "additives"), especially if the ingredient or component does not prevent the composition from curing and/or foaming Examples of additional ingredients include, but are not limited to, surfactants; stabilizers; adhesion promoters; colorants, including dyes and pigments; anti-oxidants; carrier vehicles; heat stabilizers; flame retardants; thixotropic agents; flow control additives; inhibitors; fillers, including extending and reinforcing fillers.

One or more of the additives can be present as any suitable weight percent (wt. %) of the composition, such as about 0.1 wt. % to about 15 wt. %, about 0.5 wt. % to about 5 wt. %, or about 0.1 wt. % or less, about 1 wt. %, 2, 3, 4, 5, 6, 7, 8, 9, 10, 11, 12, 13, 14, or about 15 wt. % or more of the composition. One of skill in the art can readily determine a suitable amount of additive depending, for example, on the type of additive and the desired outcome. Certain optional additives are described in greater detail below.

Suitable surfactants (or "foaming aids") include silicone polyethers, ethylene oxide polymers, propylene oxide polymers, copolymers of ethylene oxide and propylene oxide, other non-ionic surfactants, and combinations thereof. Further suitable surfactants may comprise a nonionic surfactant, a cationic surfactant, an anionic surfactant, an amphoteric surfactant, or a mixture of such surfactants.

In various embodiments, the composition comprises a fluorocarbon surfactant or fluorinated surfactant. The fluorinated surfactants can be any of those compounds known in the art which contain fluorine atoms on carbon and are also surfactants. These fluorinated surfactants can be organic or silicon containing. For example, fluorinated organic surfactants can be perfluorinated polyethers such as those which have repeating units of the formulae:

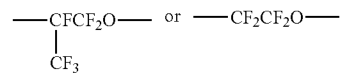

and mixtures of such units.

Silicon-containing fluorinated surfactants can be siloxanes, for example, which contain organic radicals having fluorine bonded thereto, such as siloxanes having repeating units of the formulae:

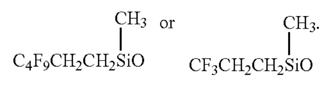

In various embodiments, adding the fluorinated surfactant to the composition decreases the cured foam density. In general, increasing the amount of fluorinated surfactant in the composition decreases the density of the foam. This is especially true for slow cure systems, where the surfactant stabilizes bubbles while the network forms and cures.

In various embodiments, the composition further comprises an organopolysiloxane resin ("resin"). Suitable resins are as describe above. In certain embodiments, the resin is an MQ resin. The resin can be useful for stabilizing the foam.

Suitable pigments are understood in the art. In various embodiments, the composition further comprises carbon black, e.g. acetylene black, titanium dioxide, chromium oxide, zinc oxide, bismuth vanadium oxide, iron oxides and mixtures thereof.

The composition may include one or more fillers. The fillers may be one or more reinforcing fillers, non-reinforcing fillers, or mixtures thereof. Examples of finely divided, reinforcing fillers include high surface area fumed and precipitated silicas including rice hull ash and to a degree calcium carbonate. Examples of finely divided non-reinforcing fillers include crushed quartz, diatomaceous earths, barium sulphate, iron oxide, titanium dioxide and carbon black, talc, and wollastonite. Other fillers which might be used alone or in addition to the above include carbon nanotubes, e.g. multiwall carbon nanotubes aluminite, hollow glass spheres, calcium sulphate (anhydrite), gypsum, calcium sulphate, magnesium carbonate, clays such as kaolin, aluminum trihydroxide, magnesium hydroxide (brucite), graphite, copper carbonate, e.g. malachite, nickel carbonate, e.g. zarachite, barium carbonate, e.g. witherite, antimony trioxide ($Sb_2O_3$) and/or strontium carbonate e.g. strontianite. Further alternative fillers include aluminum oxide, silicates from the group consisting of olivine group; garnet group; aluminosilicates; ring silicates; chain silicates; and sheet silicates. In certain embodiments, the composition includes at least one filler comprising hollow particles, e.g. hollow spheres. Such fillers can be useful for contributing to porosity and/or overall void fraction of the foam.

The filler if present, may optionally be surface treated with a treating agent. Treating agents and treating methods are understood in the art. The surface treatment of the filler(s) is typically performed, for example with a fatty acid or a fatty acid ester such as a stearate, or with organosilanes, organosiloxanes, or organosilazanes such as hexaalkyl disilazane or short chain siloxane diols. Generally, the surface treatment renders the filler(s) hydrophobic and therefore easier to handle and obtain a homogeneous mixture with the other components in the composition. Silanes such as $R^5_eSi(OR^6)_{4-e}$ where $R^5$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, $R^6$ is an alkyl group of 1 to 6 carbon atoms, and subscript "e" is equal to 1, 2 or 3, may also be utilized as the treating agent for fillers.

In various embodiments, the composition further comprises a reaction inhibitor to inhibit the cure of the composition. These inhibitors are utilised to prevent premature cure in storage and/or to obtain a longer working time or pot life of a hydrosilylation cured composition by retarding or suppressing the activity of the catalyst. Inhibitors of hydrosilylation catalysts, e.g. platinum metal-based catalysts are well known in the art and may include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines.

One class of known inhibitors of platinum catalysts includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargyl alcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

When present, inhibitor concentrations as low as 1 mole of inhibitor per mole of the metal of catalyst (iii) will in some instances impart satisfactory storage stability and cure rate. In other instances, inhibitor concentrations of up to 500 moles of inhibitor per mole of the metal of catalyst (iii) are required. The optimum concentration for a given inhibitor in a given composition is readily determined by routine experimentation. Dependent on the concentration and form in which the inhibitor selected is provided/available commercially, when present in the composition, the inhibitor is typically present in an amount of from 0.0125 to 10% by weight of the composition. Mixtures of the above may also be used.

In various embodiments, the composition further comprises an adhesion-imparting agent. The adhesion-imparting agent can improve adhesion of the foam to a base material being contacted during curing. In certain embodiments, the adhesion-imparting agent is selected from organosilicon compounds having at least one alkoxy group bonded to a silicon atom in a molecule. This alkoxy group is exemplified by a methoxy group, an ethoxy group, a propoxy group, a butoxy group, and a methoxyethoxy group. Moreover, non-alkoxy groups bonded to a silicon atom of this organosilicon compound are exemplified by substituted or non-substituted monovalent hydrocarbon groups such as alkyl groups, alkenyl groups, aryl groups, aralkyl groups, halogenated alkyl groups and the like; epoxy group-containing monovalent organic groups such as a 3-glycidoxypropyl group, a 4-glycidoxybutyl group, or similar glycidoxyalkyl groups; a 2-(3,4-epoxycyclohexyl)ethyl group, a 3-(3,4-epoxycyclohexyl)propyl group, or similar epoxycyclohexylalkyl groups; and a 4-oxiranylbutyl group, an 8-oxiranyloctyl group, or similar oxiranylalkyl groups; acrylic group-containing monovalent organic groups such as a 3-methacryloxypropyl group and the like; and a hydrogen atom.

This organosilicon compound generally has a silicon-bonded alkenyl group or silicon-bonded hydrogen atom. Moreover, due to the ability to impart good adhesion with respect to various types of base materials, this organosilicon compound generally has at least one epoxy group-containing monovalent organic group in a molecule. This type of organosilicon compound is exemplified by organosilane compounds, organosiloxane oligomers and alkyl silicates. Molecular structure of the organosiloxane oligomer or alkyl silicate is exemplified by a linear chain structure, partially branched linear chain structure, branched chain structure, ring-shaped structure, and net-shaped structure. A linear chain structure, branched chain structure, and net-shaped structure are typical. This type of organosilicon compound is exemplified by silane compounds such as 3-glycidoxypropyltrimethoxysilane, 2-(3,4-epoxycyclohexyl)-ethyltrimethoxysilane, 3-methacryloxy propyltrimethoxysilane, and the like; siloxane compounds having at least one silicon-bonded alkenyl group or silicon-bonded hydrogen atom, and at least one silicon-bonded alkoxy group in a molecule; mixtures of a silane compound or siloxane compound having at least one silicon-bonded alkoxy group and a siloxane compound having at least one silicon-bonded hydroxyl group and at least one silicon-bonded alkenyl group in the molecule; and methyl polysilicate, ethyl polysilicate, and epoxy group-containing ethyl polysilicate.

The content of the adhesion-imparting agent in the composition is not particularly limited. In certain embodiments, the content of the adhesion-imparting agent is from about 0.01 to about 10 parts by mass per 100 parts total mass of components (A) and (B).

Foam

In many embodiments, the foam is a closed-cell foam. In various embodiments, the foam has a density of less than 0.8, i.e. <0.8 grams per cubic centimeter (g/$cm^3$), alternatively <0.7 g/$cm^3$, alternatively <0.6 g/$cm^3$, alternatively <0.5 g/$cm^3$, alternatively <0.45 g/$cm^3$, alternatively <0.4 g/$cm^3$, alternatively <0.35 g/$cm^3$, alternatively <0.3 g/$cm^3$, alternatively <0.25 g/$cm^3$, alternatively <0.2 g/$cm^3$, alternatively <0.15 g/$cm^3$, alternatively <0.1 g/$cm^3$, and alternatively <0.05 g/$cm^3$.

If density is too high, the foam may be too heavy or stiff for certain applications. If density is too low, the foam may lack desired structural integrity for certain applications. Density of the foam can be determined via methods understood in the art. For example, density of the foam can be measured via the Archimedes principle, using a balance and density kit, and following standard instructions associated with such balances and kits. An example of a suitable balance is a Mettler-Toledo XS205DU balance with density kit.

In various embodiments, the foam has pores that are generally uniform in size and/or shape. In certain embodiments, the foam has an average pore size ≤5 millimeters, alternatively ≤2.5 millimeters, alternatively ≤1 millimeter, alternatively ≤0.5 millimeters, alternatively ≤0.25 millimeters, alternatively ≤0.1 millimeters, and alternatively ≤0.05 millimeters.

Average pore size can be determined via methods understood in the art. For example, ATSM method D3576-15 with the following modifications may be used: (1) image a foam using optical or electron microscopy rather than projecting the image on a screen; and (2) scribe a line of known length that spans greater than 15 cells rather than scribing a 30 mm line.

System

This disclosure also relates to a two-part system for providing the composition (referred to herein as the "system"). The system comprises a first part, part A and a second part, part B. Part A comprises at least components (i) and (iii) and Part B comprises at least components (i) and (ii) with part A free of component (ii) and part B free of component (iii). As described above Parts A and B of the composition are kept separate until steps c/d of the method as described herein to prevent premature reaction of the composition, for ease of handling and storage, for ease of formulation, etc. Typically when present the reaction inhibitor is present in part B with component (iii) but otherwise, each of the other optional components of the composition can be in either or both part A and part B or if desired may be introduced in one or more additional parts separate from the two parts (such that the system may be a three- or more part system). As hereinbefore described component (iv) is introduced into one or both of the part A composition or the part B composition during step (a) or step (b) and/or is introduced into the static mixer during step (d).

Method

As hereinbefore described the method includes the steps of:

(a) blending a part A composition comprising components (i) and (iii) and separately blending a part B composition comprising components (i) and (ii); composition;
(b) introducing the part A composition and the Part B composition into respective mixing containers and mixing;
(c) transferring resulting part A and part B mixtures of step (b) into respective pumping means;
(d) pumping the resulting part A and part B mixtures of steps (b) and (c) into a mixer unit and mixing to form a foam; and
(e) dispensing the resulting foam; wherein
(f) Component (iv) is introduced into one or both of the part A composition or the part B composition during step (a) or step (b) and/or is introduced into the static mixer during step (d).

In step (a) of the process herein the ingredients of the part A composition are blended together and separately the ingredients of the part B composition are also blended together to form respective blends. The part A blend composition might include, for the sake of example, one or more polymers in accordance with component (i) as hereinbefore described, component (iii) and one or more of the aforementioned optional components such as a surfactant, pigments or colorants and/or an MQ resin foam stabilizer. The part B blend composition might include, for the sake of example, one or more polymers in accordance with component (i) as hereinbefore described, component (ii) and one or more of the aforementioned optional components such as a surfactant, pigments or colorants and/or an MQ resin foam stabilizer. In step (a) if optional filler is present in the composition of part A or part B then typically a base comprising component (i) polymer and said filler will initially be prepared. Where required and if not pretreated the filler may be hydrophobically treated in-situ with a hydrophobing agent as described above during the preparation of the base. The remaining ingredients would then be introduced into said base after the preparation of the base. In the case when no filler is present in one or both of part A and part B the ingredients may be blended in any order of addition, optionally with a master batch, and optionally under shear.

In step (b) the part A blend composition and part B blend composition resulting from step (a) are each transferred into a respective mixing container. In one embodiment the mixing container for one or preferably both of the part A and part B blend compositions is a stirred tank or the like suitable for undertaking thorough mixing of the respective blend compositions. Optionally each mixing container is temperature controllable such that the part A composition and part B compositions being mixed can be maintained within a desired temperature range.

In step (c) thoroughly mixed compositions of part A and part B resulting from step (b) are transferred to a pump means. Optionally the pump means in each instance is a positive displacement. Optionally each pump means is temperature controllable such that the part A composition and part B composition can each be maintained within a desired temperature range. Preferably, there is sufficient over-pressure maintained in the pump means compared with the pressure in the respective mixing containers to ensure boiling of component (iv) the physical blowing agent, if present, in either or both of the part A and/or part B compositions is prevented.

In step (d) the compositions of part A and part B transferred to the pump means in step (c) are pumped into a further mixing unit which mixes the part A and part B compositions and generates or at least starts generating the foam resulting therefrom. The foam may be generated during step (d), during step (d) and step (e) or even thereafter depending on the speed of vaporization of component (iv). The mixing unit of step (d) may be a mixing block for at least the initial mixing of part A and part B compositions and then the resulting combined composition may be passed through a static mixer for being dispensed. Alternatively, the resulting foam may be dispensed directly from the mixing block. In step (d) the compositions of part A and part B are transferred into the mixer under predefined conditions such as flow rate and temperature to optimize the mixing process and foam generation.

In step (e) the foam generated or partially generated is dispensed from the mixing unit identified in step (d) via any suitable means. In one embodiment the dispensing means is a suitable dispensing tip which may be utilised to control the cell size of the silicone elastomer foam generated herein. The composition resulting from mixing step (d) may be dispensed in step (e) when the foam is only partially generated, i.e. during generation of the foam.

Step (f) relates to the introduction of the physical blowing agent. The physical blowing agent may, for the sake of example, (1) Be added completely into the part A blend during step (a); or alternatively
(2) Be added completely into the part A composition during step (b); or alternatively
(3) Be added completely into the part B blend during step (a); or alternatively
(4) Be added completely into the part B composition during step (b); or alternatively
(5) Be added partially into the part A blend and partially into the part B blend during step (a); or alternatively
(6) Be added partially into the part A composition and partially into the part B composition during step (b); or alternatively
(7) Be added partially into the part A composition and partially into the part B composition during step (b); or alternatively
(8) Be added completely directly into the mixing unit of step (d);
(9) Be added partially into the part A blend during step (a) and partially directly into the mixing unit of step (d); or alternatively
(10) Be added partially into the part A composition during step (b) and partially directly into the mixing unit of step (d); or alternatively
(11) Be added partially into the part B blend during step (a) and partially directly into the mixing unit of step (d); or alternatively
(12) Be added partially into the part B composition during step (b) and partially directly into the mixing unit of step (d); or alternatively
(13) Be added partially into the part A blend, partially into the part B blend during step (a) and partially directly into the mixing unit of step (d); or alternatively
(14) Be added partially into the part A composition, partially into the part B composition during step (b) and partially directly into the mixing unit of step (d); or alternatively
(15) Be added partially into the part A composition and partially into the part B composition during step (b), and partially directly into the mixing unit of step (d).

When the physical blowing agent is introduced into the part A blend and/or part B blend during step (a) any suitable means of introduction may be utilised. When the physical blowing agent is introduced into the part A composition and/or part B composition during step (b) any suitable means of introduction may be utilised. When the physical blowing agent is introduced directly into the mixing unit during step (d) any suitable means of introduction may be utilised although preferably the blowing agent is introduced via a suitable pumping means.

Pressure control valves may be incorporated in line between the pump and the mixing unit during step (d) to control the pressure therebetween.

One or more of the different steps in the continuous process may be temperature and/or pressure controlled enabling the blend/composition involved to be maintained during different stages of the process within a predefined temperature range, e.g. a blend or composition might be heated or cooled prior to introduction of the physical liquid blowing agent in order to accelerate or decelerate the cure and the phase change of the physical liquid blowing agent selected, depending on the boiling point of the agent being used and the desired end properties of the foam being produced.

Advantageously, it was determined that various properties of foam produced using the process as described herein may be controlled by controlling different aspects of the process. This can be very important for a continuous process as described herein as the physical properties of the foam produced can effect a variety of the properties sought after by end users of the foams produced by the continuous process herein such as, for the sake of example, thermal conductivity, acoustic impedance, and foam density. Hence, having the ability to control physical characteristics of a foam resulting from a continuous process as described herein is critical for the process to be successful. For, example, the rise of the resulting elastomer foam, amongst other properties may be controlled in the above continuous process by varying the dispense temperature, flow rate and/or varying the concentration of the physical blowing agent.

In one embodiment, the dispense temperature of the physically blown silicone RTV foam may be used to control the timing and amount of the rise of the foam because when the formulation containing a liquid blowing agent is dispensed at a temperature below the boiling point of the blowing agent, foaming is delayed until the blowing agent warms (via conduction of heat from the environment) and vaporizes. This has several desirable effects, such as:

(i) At cold dispense temperatures, the amount of foam rise is more consistent over a wider range of flow rates whilst it was found that at warmer dispense temperatures, the foam rises less at low flow rates. This leads to more robust processing and greater tolerance of flow rate changes;
(ii) At cold dispense temperature, full foam rise is delayed when compared to warm dispense temperature which is desirable in applications where the dispensed material must flow before rising. It is surmised that the cooler temperature slows the crosslinking reaction, keeping viscosity low enough to flow, and also delays the vaporization of the blowing agent which causes the foam to rise; and (iii) Dispensing at the cold temperature results in foams which are less dense than the foams dispensed at the warm temperature. This can be desirable because it allows less solid material to be used to fill a given volume.

In another embodiment the amount of liquid blowing agent used with the foam composition may be utilised to tune the amount of rise of the foam as well as the volume and density of the physically blown silicone foam, in particular a physically blown silicone RTV foam. This is because the amount of liquid blowing agent introduced into the silicone formulation via any of the combinations described above directly affects how much physical blowing agent remains in the formulation upon dispensing and eventually vaporizing. It was found that lower levels of the physical liquid blowing agent tend to produce lower volume foams due to the addition of a smaller volume of the physical liquid blowing agent capable of expanding into bubbles during foam formation whilst higher loadings of the physical liquid blowing agent provided a more volatile material which is capable of creating a larger foam cell structure, and a foam with a comparatively lower volume. Hence, whilst holding other conditions constant, the density of the physically-blown silicone foam can be tuned by altering the physical liquid blowing agent level within the range of liquid solubility in the silicone components of the formulation providing a means controlling foam density dependent on the target application.

In another embodiment it was found that volume rise of the foam as well as the foam density of a foam produced using the continuously process for providing physically blown silicone RTV foam herein may be achieved by controlling dispensing flow rate of the foam. It was identified that said dispensing flow rate directly affects the final character of the foam, providing a further alternative means for tuning the characteristics of the foam produced. Without being tied to current theories it is believed that this is caused by the rate of vaporization of the liquid blowing agent as it boils near room temperature. It was determined that continuous dispensing of an RTV silicone foam, in accordance with the process herein, with a given physical liquid blowing agent loading at lower flow rates lead to production of a foam having a lower volume expansion. It is thought this was largely due to the physical liquid blowing agent vaporizing rapidly as the mixed formulation exits the dispense tip (when present). Lower dispensing flow rates limit the amount of physical liquid blowing agent that can be trapped inside the foam (which is the primary cause of volume expansion in a physically blown foam). The rate of physical liquid blowing agent vaporization tends to be faster than the rate of curing of the RTV foam, which leads to a lower fraction of physical liquid blowing agent trapped in the foam. Higher flow rates allow the foam with physical liquid blowing agent a longer time to begin to cure while a larger fraction of the original loading of physical liquid blowing agent is trapped in the RTV formulation. This allows more of the foam to form elastomeric crosslinks prior to the complete vaporization of the physical liquid blowing agent, which in turn leads to a larger foam volume expansion upon the vaporization of the physical liquid blowing agent while it is trapped in the foam.

It was also determined that control of the dispensing flow rates can directly impact the density of the fully cured foam because the volume expansion and foam density were found to be intrinsically linked, hence by controlling volume expansion one can vary the end product foam density such that a foam with low volume expansion results in a foam product having a higher foam density. Conversely, using a higher flow rate yields a foam having a relatively larger volume expansion and a lower foam density.

As mentioned previously herein, when the dispensing means herein may include a suitable dispensing tip. When present if desired the dispensing tip may be utilised to control the cell size of the silicone elastomer foam generated herein by varying the dispensing tip gauge.

When first formed, each blend/composition of part A, part B and the resulting combination thereof can have a wide viscosity range dependent on the ingredients used. In various embodiments, the composition has a viscosity of from about 1,000 to about 100,000 mPa·s, alternatively about 1,000 to about 50,000 mPa·s, alternatively about 1,000 to about 25,000 mPa·s, alternatively about 1,000 to about 10,000 mPa·s, alternatively about 1,000 to about 7,500 mPa·s, and alternatively about 2,500 to about 5,000 mPa·s. Viscosity can be determined via methods understood in the art.

BRIEF DESCRIPTION OF THE FIGURES

The Figures herein are provided to illustrating the methods utilised herein and the resulting foams produced and not to limit the invention and are as follows:—

In FIG. 1 there is provided a schematic view of a continuous process for making a silicone foam as described herein in which there is provided a receiving means (1) for receiving the ingredient of a part A composition as defined herein and a receiving means (2) for receiving the ingredient of a part B composition as defined herein. There is also provided a stirred tank (4) provided to mix the ingredients of the part A composition and a stirred tank (5) provided to mix the ingredients of the part B composition. There is also provided a pumping means (6) adapted to pump mixed part A composition into a mixing unit ((9*a*) and optionally (9*b*) and/or (9*c*)) as well as a pumping means (8) adapted to pump mixed part B composition into said mixing unit ((9*a*) and optionally (9*b*) and/or (9*c*)). Mixing unit ((9*a*) and optionally (9*b*) and/or (9*c*)) comprises mixing block (9*a*) and optionally additionally comprises a static mixer (9*b*) and/or a dispensing tip (9*c*) and is provided to mix the part A composition and part B composition together and to dispense the resulting silicone foam.

Figure 1:
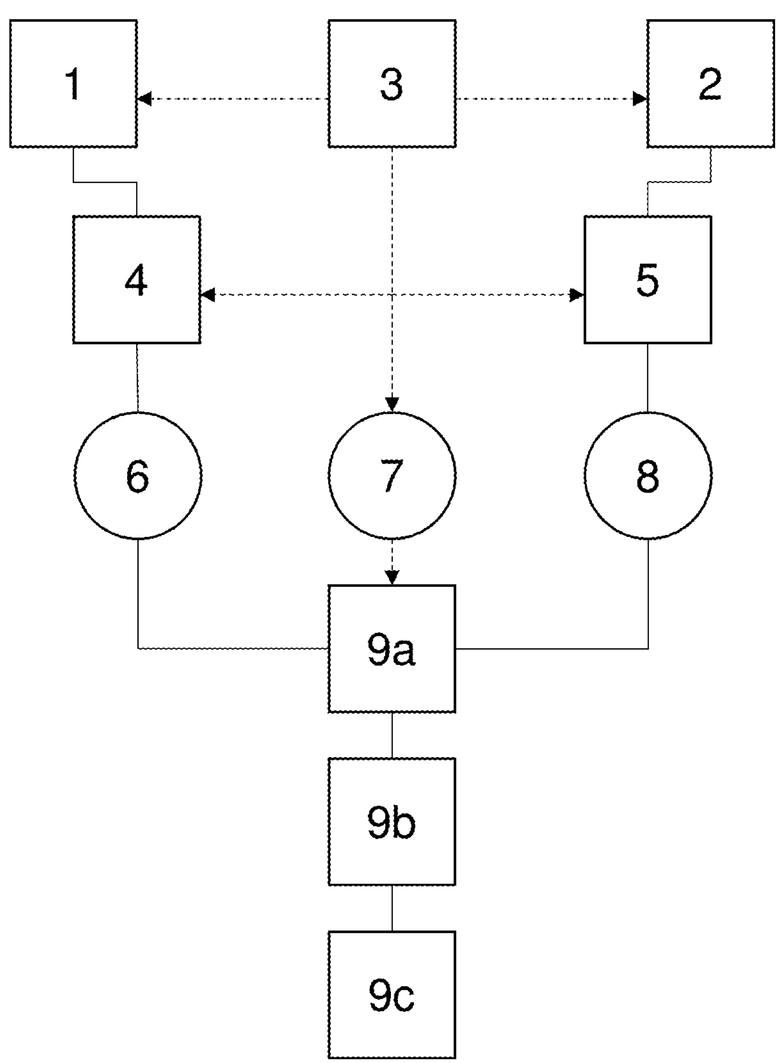
FIG. 1 is a schematic view of a continuous process as described herein for the manufacture of silicone foams utilising a physical liquid blowing agent.

As hereinbefore described the foam is generated using a physical liquid blowing agent. A reservoir of said physical liquid blowing agent is contained in container (3). The physical liquid blowing agent may be supplied during the continuous process to any one or more of receiving means (1), receiving means (2), stirred tank (4), stirred tank (5) and/or directly into mixing block (9*a*) so that it is thoroughly mixed with the other ingredients in order to continuously produce a silicone foam. When supplied directly into mixing block (9*a*) the physical liquid blowing agent may if desired be transported thereto by way of a pump (7) to aid addition into the mixing block (9*a*). One or more of receiving means (1), receiving means (2), stirred tank (4), stirred tank (5) and/or mixing unit ((9*a*) and optionally (9*b*) and/or (9*c*)) may be temperature and pressure controlled. Given the nature of the physical liquid blowing agent it may be desired to vary the temperature in regions pre or post addition of the physical liquid blowing agent as a means of controlling when and where the blowing agent changes state from a liquid to a vapour or gas. Such temperature control must be able to both heat and cool the respective blend and/or composition so that it can be adapted for use with a variety of physical liquid blowing agents dependent on their boiling points.

FIGS. 2*a*, 2*b*, 3*a* and 3*b* are further discussed in the Examples.

INDUSTRIAL APPLICABILITY

The compositions, foams, and methods of this disclosure are useful for a variety of end applications, and are not limited to a particular one. Examples of suitable applications include space filling applications, automotive applications (e.g. for control modules), and the like. The foams can be used to at least partially cover or encapsulate articles, such as batteries and other electronic components. The foams can also be used for thermal insulation. Moreover, the foams can be used as a fire block. In a further alternative the foams may be used for water exclusion applications, i.e. as a moisture seal. In general, the foams of this disclosure provide a combination of desirable physical properties relative to conventional foams, including one or more of the following: reduced weight, lowered density, increased thermal resistance, increased stability, etc. The foams can be formed in environments where the formation of hydrogen gas is a concern. In addition, the foams can be foamed at room temperature or thereabout, which is useful for temperature sensitive applications.

The following examples, illustrating the compositions, foams, and methods, are intended to illustrate and not to limit the invention.

EXAMPLES

Compositions were generated utilizing different types and amounts of components. These are detailed below. All amounts are in weight % unless indicated otherwise. As discussed above all viscosities are measured at 25° C. using a Brookfield LV DV-E viscometer. The alkenyl and/or alkynyl content of polymers as well as the silicon-bonded hydrogen (Si—H) content of polymers was determined using quantitative infra-red analysis in accordance with ASTM E168.

TABLE 1-A

Standard part A composition used in the Examples (excluding Blowing Agent)

| Part A | Wt. % |
|---|---|
| Dimethylvinylsiloxy-terminated dimethyl siloxane, having a viscosity of ~430 mPa · s and ~0.46 wt. % Vi. | 59.00 |
| Dimethylvinylsiloxy-terminated dimethyl siloxane, having a viscosity of ~39,000 mPa · s and ~0.08 wt. % Vi. | 23.00 |
| Benzyl Alcohol | 0 |
| Trimethylsiloxy-terminated dimethyl siloxane 407 type resin with 2-(perfluorohexyl) ethyl alcohol, having a viscosity of ~350 mPa · s. | 12.00 |
| A slurry of dimethylvinylsiloxy-terminated dimethyl siloxane; zinc oxide and carbon black, having a viscosity of 350 mPa · s and ~0.46 wt. % Vi. | 5.75 |
| 1,3-Diethenyl-1,1,3,3-Tetramethyldisiloxane Complexes (Platinum)) in (Dimethyl Siloxane, Dimethylvinylsiloxy-terminated; Dimethyl Siloxane, | 0.25 |
| total | 100.00 |

TABLE 1-B

Standard part B composition used in the Examples (excluding Blowing Agent)

| Part B | Wt. % |
|---|---|
| Dimethylvinylsiloxy-terminated dimethyl siloxane, having a viscosity of ~430 mPa · s and ~0.46 wt. % Vi. | 64.80 |
| a blend of Dimethylvinylsiloxy-terminated dimethyl siloxane, having a viscosity of ~430 mPa · s and ~0.46 wt. % Vi; and a $^{Vi}$MMQ resin, having a viscosity of ~45,000 mPa · s and ~0.39 wt. % Vi. | 32.00 |
| methylhydrogen siloxane, trimethylsiloxy-terminated, having a viscosity of ~30 mPa · s and ~1.6 wt. % SiH. | 3.00 |
| Tetramethyltetravinylcyclotetrasiloxane, having a viscosity of ~3 mPa · s and ~31.40 wt. % Vi. | 0.20 |
| total | 100.00 |

The physical blowing agent used in the examples unless otherwise indicated was 1,1,1,3,3-pentafluoropropane (HFC-245fa) which has a boiling point of about 15.3° C.

Comparative Examples

Foams were produced at the laboratory bench scale in a non-continuous mode using a hand-stirring method involving mixing the two-part formulation with the desired amount of liquid blowing agent. The liquid blowing agent was added in equal amounts to both Part A and Part B of the composition then mixed together and stirred vigorously by hand for 30 seconds, after which the foam formulation was allowed to cure. In some instances, a pneumatic gun was additionally utilised. This used air pressure to push two pistons, which deliver both parts with the liquid blowing agent to a static mixer.

Figure 2A:
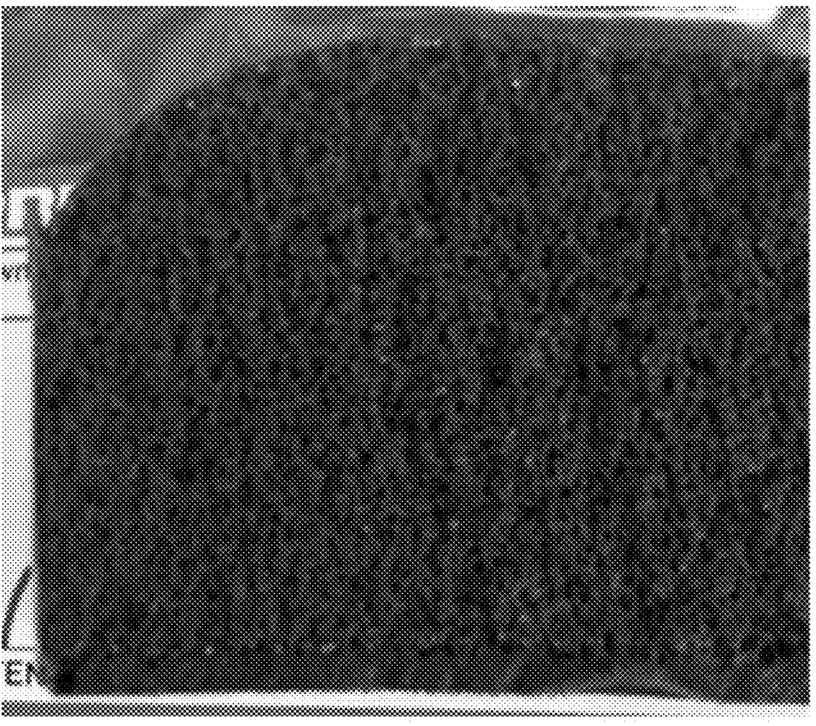
FIG. 2*a* is an image of a foam produced using a comparative hand-stirred batch method.
Figure 2B:
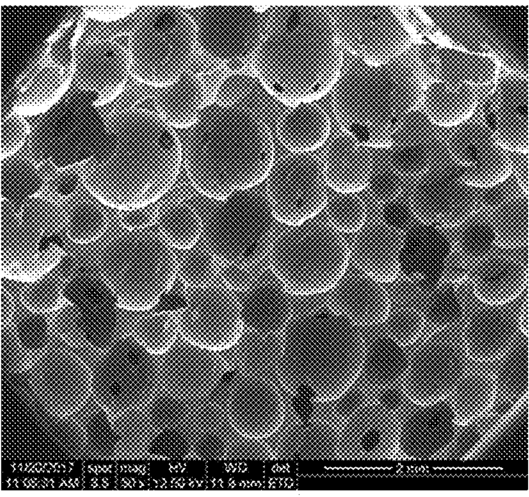
FIG. 2*b* is an SEM image of the foam of FIG. 2*a*.

Physically blown RTV silicone foams were reproducibly generated using these bench-scale methods. Both methods generate foams with similar rise profiles (kinetics of foam expansion), density, and visual appearance and an example of a foam prepared via the hand stirring method is depicted in FIG. 2*a* with SEM imaging thereof depicted in FIG. 2*b*. The SEM imaging showed that the foam cell structures using either batch method are also similar using the same conditions for each test. The foams were prepared by making the compositions as indicated in Table 1 above and then by adding 10% by weight of the total weight of the part A composition and then by adding 10% by weight of the total weight of the part B composition of liquid blowing agent HFC245fa (1,1,1,3,3-pentafluoropropane) as a physical blowing agent. These examples demonstrate the ability to create a physically blown silicone foam at the bench scale. However, such batch preparations are not really commercially practicable.

Example 1 Continuous Process

In this example a continuous process as depicted in FIG. 1 was utilised with equal total amounts of part A and part B compositions being produced and mixed in together in the mixing unit. The liquid blowing agent was introduced into stirred mixers (4) and (5) and the pumping means (6) and (8) were positive displacement ISCO pumps. The mixing unit utilised to mix the part A and part B compositions together in the current example contained each of (9*a*), (9*b*) and (9*c*).

In Example 1 however, the liquid blowing agent was introduced in equal amounts into stirred tanks (4) and (5). The following regime was utilised:—

1. Blend the components of Parts A and B respectively in receivers (1) and (2)
2. Transfer 1000 grams of each of Parts A and B receivers (1) and (2) into respective stirred tanks (4) and (5)
3. Load 100 grams HFC-245fa blowing agent into each of stirred tanks (4) and (5)
4. Fill pistons of the positive displacement ISCO pumps (4) and (5), maintaining sufficient overpressure to prevent boiling the blowing agent.
5. Discharge the pumps (6) and (8) at a controlled rate, through mixing block (9*a*), static mixer (9*b*) and dispense tip (9*c*) into collection container.

Figure 3A:
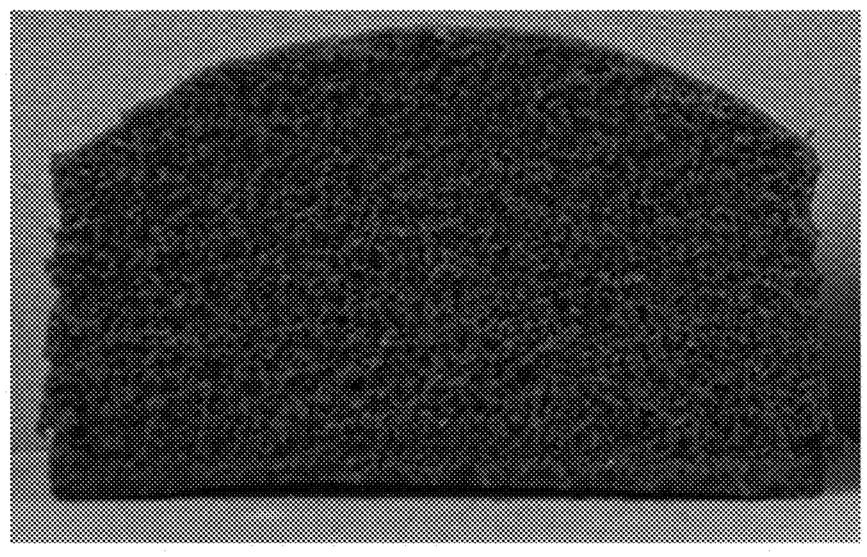
FIG. 3*a* is an image of a foam produced using the continuous method as defined herein.
Figure 3B:
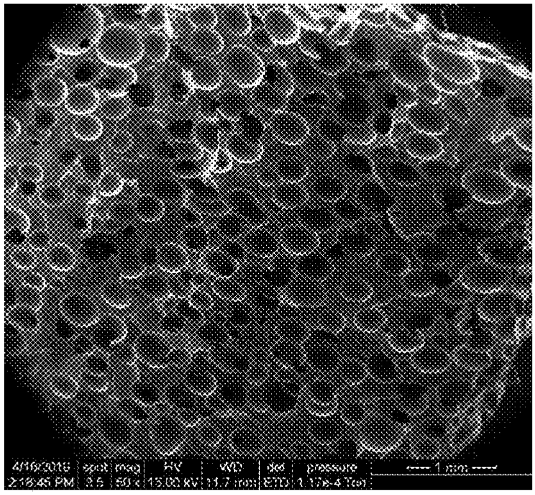
FIG. 3*b* is an SEM image of the foam of FIG. 3*a*.

An example of a foam product produced in accordance with the above example is shown in FIG. 3*a* and an SEM image thereof is provided as FIG. 3*b*. It can be easily seen that the continuous process as described herein provides a similar product to that of the batch process but given the continuous Nature of the process a much greater throughput may be achieved.

Example 2 Controlling Rise of Silicone Elastomer Foam by Varying Dispense Temperature A series of examples to show it is possible to use dispense temperature to control the timing and amount of the rise of a physically blown silicone RTV foam were undertaken. When the formulation containing a liquid blowing agent is dispensed at a temperature below the boiling point of the blowing agent, foaming is delayed until the blowing agent warms (e.g. via conduction of heat from the environment) and vaporizes. In the following examples, the blowing agent used in this series of examples was HFC-245fa, which boils at 15.3 C. Hence, tests were run at two dispense temperatures: about 25° C. for the 'warm' trials, and 10-12° C. for the 'cold' trials.

Table 2a shows foam volume as a function of time for a set of experiments which was carried out by dispensing room temperature reactants (warm trials) with a fixed amount of blowing agent, following the process described with respect to Ex. 1 above with the final mixer unit being the mixing block, static mixer and dispense tip, combination. The resulting foam was dispensed into a calibrated vial. The initial volume dispensed was 15 ml.

TABLE 2a

| | Tip | Flow Rate | Rise Time (min) | | | | | | | |
|---|---|---|---|---|---|---|---|---|---|---|
| Sample ID | Gauge | (mL/min) | 0 | 2 | 4 | 6 | 8 | 10 | 12 | 14 |
| Comp. 2-1 | 20 | 10 | 14.5 | 17 | 19 | 20 | 21 | 22 | 22 | 22 |
| Comp. 2-2 | 20 | 10 | 15 | 17.5 | 20 | 20.5 | 22 | 22.5 | 23 | 22.5 |
| Comp. 2-3 | 20 | 20 | 17 | 19 | 21 | 22.5 | 24 | 24 | 24 | 24 |
| Comp. 2-4 | 20 | 20 | 17 | 18.5 | 20 | 21.5 | 23 | 23 | 24 | 24 |
| Comp. 2-5 | 20 | 30 | 17 | 20.5 | 23 | 25 | 26 | 27 | 27 | 27 |
| Comp. 2-6 | 20 | 30 | 17 | 20 | 23 | 24 | 25 | 26 | 26 | 26 |
| Comp. 2-7 | 18 | 10 | 15 | 16 | 18 | 19 | 21 | 21.5 | 22 | 21.5 |
| Comp. 2-8 | 18 | 10 | 15 | 17.5 | 19 | 20 | 21 | 22.5 | 23 | 22.5 |
| Comp. 2-9 | 18 | 20 | 15 | 17.5 | 20 | 22.5 | 25 | 25.5 | 26 | 26 |
| Comp. 2-10 | 18 | 20 | 15 | 18 | 21 | 22.5 | 25 | 26 | 26 | 26 |
| Comp. 2-11 | 18 | 30 | 17 | 21 | 23 | 25 | 28 | 28 | 28 | 28 |
| Comp. 2-12 | 18 | 60 | 17 | 23 | 27 | 30 | 32 | 32 | 32 | 32 |

In the following Table 2b, there are provided a series of experiments tracking foam volume as a function of time carried out by dispensing cold (10-12° C.) reactants (i.e. below the boiling point of blowing agent (HFC-245fa), through a static mixer and dispense tip, into a calibrated vial. The initial volume dispensed was 15 ml. The two Tables (2a and 2b) show two different diameter dispense tips (18 and 20 gage), and a series of flow rates from different trials (generally 2 repeats at 10, 20, and 30 ml/min)

TABLE 2b

| | Tip | Flow Rate | Rise Time (min) | | | | | | | |
|---|---|---|---|---|---|---|---|---|---|---|
| Sample ID | Gauge | (mL/min) | 0 | 2 | 4 | 6 | 8 | 10 | 12 | 14 |
| Ex. 2-1 | 20 | 10 | 15 | 17.5 | 22 | 25 | 28 | 30 | 32 | 32 |
| Ex. 2-2 | 20 | 10 | 16 | 18 | 21 | 23 | 27 | 29 | 31 | 31 |
| Ex. 2-3 | 20 | 20 | 17 | 20.5 | 25 | 28 | 31 | 33 | 33 | 33 |
| Ex. 2-4 | 20 | 20 | 16 | 20 | 23 | 27 | 29 | 31 | 32 | 32 |
| Ex. 2-5 | 20 | 30 | 15 | 20 | 23 | 27 | 30 | 31 | 32 | 32 |
| Ex. 2-6 | 18 | 10 | 15 | 17 | 20 | 24 | 28 | 31 | 32 | 32 |
| Ex. 2-7 | 18 | 10 | 15 | 17.5 | 22 | 25 | 29 | 32 | 32 | 32 |
| Ex. 2-8 | 18 | 20 | 15 | 17.5 | 21 | 25 | 28 | 30 | 31 | |
| Ex. 2-9 | 18 | 20 | 15 | 19 | 22 | | 29 | 31 | 32 | |
| Ex. 2-10 | 18 | 30 | 16 | 19 | 22 | 26 | 28 | 31 | 32 | 32 |

Comparing Tables 2a and 2b shows that for all tested flow rates and dispense tips, the foam rise was more consistent when using parts A and B which had been cooled to 10-12° C., vs. those that were dispensed at room temperature. Foam rise was also greater for the colder dispense temperature than for all but the highest flow rate at the warmer dispense temperature. At cold dispense temperature, full foam rise is delayed when compared to warm dispense temperature. In the examples with 18-gauge tips, the foam rises in 10-12 minutes when dispensed cold, vs 8-10 minutes when dispensed warm. In the examples with 20-gauge tips, the foam rises in 12 minutes when dispensed cold, vs 10 minutes when dispensed warm. This is desirable in applications where the dispensed material must flow before rising. The cooler temperature delays the crosslinking reaction, keeping viscosity low enough to flow, and also delays the vaporization of the blowing agent which causes the foam to rise.

Example 3 Controlling Rise of Silicone Elastomer Foam by Varying Flow Rate

It was found that the dispensing flow rate using an RTV formulation with a physical blowing agent directly affects the final character of the foam, enabling a tuning of the dispensing conditions to target end-use properties of the final product. This phenomenon is largely related to the rate of vaporization of the liquid blowing agent as it boils near room temperature. In the examples, the liquid blowing agent used was HFC-245fa, which boils at 15.3° C. The ambient temperature was 25° C., and the flow rates RTV silicone foam formulation with added liquid blowing agent tested were varied.

It was found that continuous dispensing of an RTV silicone foam formulation with a given the physical liquid blowing agent loading at lower flow rates tends to lead to a foam that has a lower volume expansion. This is largely due to the physical liquid blowing agent vaporizing rapidly as the mixed formulation exits the dispense tip. Lower dispensing flow rates limit the amount of the physical liquid blowing agent that can be trapped inside the film formulation, which is the primary cause of volume expansion in a physically blown foam. The rate of the physical liquid blowing agent vaporization tends to be faster than the rate of curing of the RTV foam, which leads to a lower fraction of the physical liquid blowing agent trapped in the foam. Higher flow rates allow the foam with the physical liquid blowing agent a longer time to begin to cure while a larger fraction of the original loading of the physical liquid blowing agent is trapped in the RTV formulation. This allows more of the foam to form elastomeric crosslinks prior to the complete vaporization of the physical liquid blowing agent, which in turn leads to a larger foam volume expansion upon the vaporization of the physical liquid blowing agent while it is trapped in the foam.

Dispensing flow rates can directly impact the density of the fully cured foam. The volume expansion and the foam density are intrinsically linked, so a lower volume expansion corresponds to a higher foam density due to less physical liquid blowing agent trapped in the foam structure in the final product. A higher flow rate, in turn, will yield a foam with a larger volume expansion and a lower density.

Example 4 Controlling Rise of Silicone Elastomer Foam by Varying Level of Physical Blowing Agent It was found that amount of liquid blowing agent may be utilised to control the density of a physically blown silicone RTV foam. The amount of liquid blowing agent loaded into the silicone formulation prior to mixing was used to tune the rise in volume and density of the foam produced. The initial loading of blowing agent directly affects how much physical blowing agent remains in the formulation upon dispensing and eventually vaporizing. In the examples, the blowing agent used was HFC-245fa, which boils at 15.3° C. The ambient temperature was 25° C., and the loadings of liquid blowing agent tested were varied.

Comparative Examples: Table 4a below shows foam volume as a function of time for a set of experiments which were carried out by dispensing cooled reactants (~15° C.) with 10% blowing agent, through the mixing block/static mixer and dispense tip combination mixer unit, into a calibrated vial. The initial volume dispensed was targeted to be 15 ml for each sample, as collected in a tapered centrifuge tube. Samples are shown using two different gauge dispense tips.

Table 4a below shows foam volume as a function of time:

| | Tip | Flow Rate | Rise Time (min) | | | | | | | |
|---|---|---|---|---|---|---|---|---|---|---|
| Sample ID | Gauge | (mL/min) | 0 | 2 | 4 | 6 | 8 | 10 | 12 | 14 |
| Comp. 4-1 | 20 | 10 | 15 | 16 | 16 | 17 | 18 | 18 | 19 | 18.5 |
| Comp. 4-2 | 20 | 10 | 15 | 16 | 16 | 17 | 18 | 18 | 19 | 18.5 |
| Comp. 4-3 | 20 | 20 | 15 | 16 | 17 | 18 | 19 | 19 | 19 | 19 |
| Comp. 4-4 | 20 | 20 | 17 | 18 | 18.5 | 19 | 20 | 20 | 20 | 20 |
| Comp. 4-5 | 20 | 30 | 16 | 18 | 18 | 19 | 20 | 20.5 | 21 | 20.5 |
| Comp. 4-6 | 18 | 10 | 16 | 18 | 17.5 | 18 | 18 | 18.5 | 19 | 19 |
| Comp. 4-7 | 18 | 10 | 16 | 18 | 17.5 | 18 | 19 | 19 | 19 | 19 |
| Comp. 4-8 | 18 | 20 | 15 | 18 | 17.5 | 18 | 19 | 19.5 | 20 | 20 |
| Comp. 4-9 | 18 | 30 | 15.5 | 18 | 17.5 | 18 | 19 | 20 | 21 | 21 |
| Comp. 4-10 | 18 | 40 | 17 | 19 | 20 | 21 | 22 | 22.5 | 23 | 23 |
| Comp. 4-11 | 18 | 60 | 18 | 21 | 22 | 24 | 26 | 26 | 26 | 26 |

Inventive Examples are provided in Table 4b which shows foam volume as a function of time for a set of experiments which were carried out by dispensing with 15% physical liquid blowing agent, through a static mixer and different dispense tips, into a calibrated vial. The initial volume dispensed was targeted to be 15 ml. The two Tables (4a and 4b) show two dispense tips of different diameters (18 and 20 gauge), while the lines represent different trials at varied flow rates (generally 2 repeats at 10, 20, and 30 ml/min).

TABLE 4b

| | Tip | Flow Rate | Rise Time (min) | | | | | | | |
|---|---|---|---|---|---|---|---|---|---|---|
| Sample ID | Gauge | (mL/min) | 0 | 2 | 4 | 6 | 8 | 10 | 12 | 14 |
| Ex. 4-1 | 20 | 10 | 16 | 18 | 19 | 20 | 21 | 22 | 22 | 22 |
| Ex. 4-2 | 20 | 10 | 16 | 18 | 18 | 19 | 20 | 21 | 22 | 22 |
| Ex. 4-3 | 20 | 20 | 16 | 18 | 19 | 22 | 23 | 23 | 23 | 23 |
| Ex. 4-4 | 20 | 20 | 16 | 18 | 19 | 21 | 23 | 23 | 23 | 23 |
| Ex. 4-5 | 20 | 40 | 19 | 21 | 23 | 28 | 28 | 28 | 28.5 | 29 |
| Ex. 4-6 | 20 | 40 | 19 | 22 | 25 | 28 | 28 | 29 | 28.5 | 29 |
| Ex. 4-7 | 18 | 10 | 16 | 18 | 18 | 19 | 20 | 20 | 20.5 | 21 |
| Ex. 4-8 | 18 | 10 | 16 | 18 | 18 | 18 | 19 | 20 | 20 | 21 |

TABLE 4b-continued

| Sample ID | Tip Gauge | Flow Rate (mL/min) | Rise Time (min) 0 | 2 | 4 | 6 | 8 | 10 | 12 | 14 |
|---|---|---|---|---|---|---|---|---|---|---|
| Ex. 4-9 | 18 | 20 | 15 | 18 | 18 | 19 | 20 | 21 | 22 | 22 |
| Ex. 4-10 | 18 | 20 | 16 | 18 | 18 | 19 | 20 | 21 | 22 | 22 |
| Ex. 4-11 | 18 | 40 | 17 | 18 | 19 | 20 | 21 | 22 | 22.5 | 23 |
| Ex. 4-12 | 18 | 40 | 17 | 18 | 19 | 20 | 21 | 22 | 22.5 | 23 |

Comparing tables 4a and 4b that for nearly all tested flow rates and dispense tips, the foam rise was higher when using 15% physical liquid blowing agent versus 10% physical liquid blowing agent. This demonstrates the ability to control foam rise by tailoring the loading of physical liquid blowing agent added to the silicone foam formulation without changing any reacting components.

Table 4c illustrates that there is also some effect of physical liquid blowing agent loading on final foam density. In nearly all cases tested the formulations with 15% physical liquid blowing agent yielded a foam with a lower density than the corresponding foam with 10% physical liquid blowing agent. This indicates that the level of physical liquid blowing agent added to the formulation can be used to control the final foam density.

TABLE 4c

Effect of physical liquid blowing agent (LBA) loading on density with various flow rates and dispense tips

| Sample ID | Tip Gauge | LBA Loading (%) | Flow Rate (mL/min) | Measured Foam Density (g/mL) |
|---|---|---|---|---|
| Ex. 4-13 | 20 | 15 | 10 | 0.542 |
| Ex. 4-14 | 20 | 15 | 20 | 0.480 |
| Ex. 4-15 | 20 | 15 | 40 | 0.447 |
| Ex. 4-16 | 20 | 10 | 10 | 0.561 |
| Ex. 4-17 | 20 | 10 | 20 | 0.570 |
| Ex. 4-18 | 20 | 10 | 30 | 0.587 |
| Ex. 4-19 | 18 | 15 | 10 | 0.545 |
| Ex. 4-20 | 18 | 15 | 20 | 0.575 |
| Ex. 4-21 | 18 | 15 | 40 | 0.587 |
| Ex. 4-22 | 18 | 10 | 10 | 0.580 |
| Ex. 4-23 | 18 | 10 | 20 | 0.597 |
| Ex. 4-34 | 18 | 10 | 30 | 0.578 |
| Ex. 4-25 | 18 | 10 | 40 | 0.546 |

It was determined that the loading level of physical liquid blowing agent can directly impact the ultimate rise and density of the fully cured foam. Lower levels physical liquid blowing agent tend to produce lower volume foams due to the addition of a smaller volume of physical liquid blowing agent capable of expanding into bubbles during foam formation. Higher loadings of physical liquid blowing agent provide more volatile material which is capable of creating a larger foam cell structure, and a foam with a comparatively lower volume. Furthermore, holding other conditions constant, the density of the physically-blown silicone foam can be tuned by altering the physical liquid blowing agent level within the range of liquid solubility in the silicone components of the formulation. This gives a simple, non-reactive means with which to change the foam density for the target application. This approach would not require reformulation of the silicone components.

Example 5 Controlling Cell Size of Continuously Produced Physically Blown Silicone Foam Using a Dispensing Tip It was also identified that cell size of a continuously produced a physically blown silicone RTV foam may be controlled by varying the dispensing tip (9*c*) gauge. Two-part physically-blown RTV silicone foams can be produced with tunable cell sizes with proper dispensing tip gauge selection. In the examples, the physical blowing agent used was liquid HFC-245fa, however a host of alternative physical blowing agents can be used as is practical in the particular dispensing scenario. Dispensing tips were attached to the end of a static mixer (9*b*) and were varied in gauge size ranging from 20 to 16.

Comparative Examples: Two-part physically blown RTV silicone foams can be continuously produced by contacting both parts A and B through a static mixer. The mixture that leaves the static mixer will then spontaneously react at room temperature through a hydrosilation reaction, foaming due to the addition of the physical blowing agent. An example of this process was tested using a 9-inch (22.86 cm), 24 element static mixer at a total volumetric flow rate of 40 mL/min. The formulation contained 15% HFC245fa. No dispensing tip was used.

It was found that the SEM image resulting from the aforementioned procedure showed cell sizes ranging from about 100 μm to nearly 800 μm, with a few large cells exceeding 1000 μm. This polydisperse cell distribution is largely the effect of rapid vaporization of the physical blowing agent due to limited back pressure provided by the static mixer without the addition of a dispense tip. It was surmised that the fluid in the static mixer is near atmospheric pressure during mixing, which allows for the liquid blowing agent to begin to vaporize in the static mixer, leading to premature vaporization. This is generally considered an undesirable outcome due to lack of control of the foam microstructure.

It was found that use of a dispensing tip enables better control of foam cell size. Foams made with a 16-gauge tip (1.19 mm ID) create foams with a smaller average cell size as compared to the control test case with no tip used. As the tested tip inner diameter was narrowed with the 18-gauge (0.84 mm ID) and 20-gauge (0.58 mm ID) tips, the average observed cell size decreased. The SEM images show that the most consistent distribution of small cells is observed with the narrowest tip tested (20 gauge) at the higher end of the tested flow rates (20, 40 mL/min).

It was found that foam cell size was directly related to a number of foam properties, including but not limited to thermal conductivity, acoustic impedance, and foam density. Control of these properties is critical to proper design of silicone foam for the desired application. Selection of a dispensing tip that can predictably deliver a known range of cell sizes was found to assist. in this process. It was also determined that the ability to delay vaporization of a liquid blowing agent by maintaining overpressure during the mixing of the two-part composition as hereinbefore described thereby avoiding a larger fraction of the liquid blowing agent vaporizing too rapidly, leading to increased blowing agent bubble growth and aggregation prior to substantial elastomeric network formation in the foam i.e. avoids large and unpredictable foam cell sizes, which are preferably avoided in this process.

What is claimed is:

1. A continuous method for forming a foamed silicone elastomer from a composition, the composition comprising:

(i) an organopolysiloxane having at least two silicon-bonded ethylenically unsaturated groups per molecule;
(ii) an organohydrogensiloxane having at least two silicon-bonded hydrogen atoms per molecule;
(iii) a hydrosilylation catalyst; and
(iv) a physical blowing agent;
wherein said method comprises the steps of:
(a) blending a part A composition comprising components (i) and (iii) and separately blending a part B composition comprising components (i) and (ii);
(b) introducing the part A composition and the Part B composition into respective mixing containers and mixing;
(c) transferring resulting part A and part B mixtures of step (b) into respective pumping means;
(d) pumping the resulting part A and part B mixtures of steps (b) and (c) into a mixer unit and mixing to form a foam in the mixer unit; and
(e) dispensing the resulting foam; wherein
(f) component (iv) is introduced into one or both of the part A composition or the part B composition during step (a) or step (b) and/or is introduced into the mixer unit during step (d); and
wherein step (f) takes place at a temperature≤the boiling point of the physical blowing agent (iv).

2. The method as set forth in claim 1, wherein one or more of steps (a) to (e) is undertaken while temperature and/or pressure controlled.

3. The method as set forth in claim 1, wherein no chemical blowing agent is used.

4. The method as set forth in claim 1, wherein component (iv) comprises a hydrofluorocarbon (HFC).

5. The method as set forth in claim 1, wherein component (iv) comprises 1,1,1,3,3-pentafluoropropane (HFC-245fa).

6. The method as set forth in claim 1, with the composition further comprising at least one additive selected from the group consisting of surfactants, organopolysiloxane resins, fillers, reaction inhibitors, colorants, and combinations thereof.

7. The method as set forth claim 1, wherein rise of the resulting foam is controlled by varying the dispense temperature, flow rate and/or varying the concentration of the physical blowing agent (iv).

8. The method as set forth claim 1, wherein during step (f) the physical blowing agent (iv) is introduced into the composition by being added:
(1) completely into the part A composition during step (a); or
(2) completely into the part A composition during step (b); or
(3) completely into the part B composition during step (a); or
(4) completely into the part B composition during step (b); or
(5) partially into the part A composition and partially into the part B composition during step (a); or
(6) partially into the part A composition and partially into the part B composition during step (b); or
(7) completely directly into the mixer unit of step (d); or
(8) partially into the part A composition during step (a) and partially directly into the mixer unit of step (d); or
(9) partially into the part A composition during step (b) and partially directly into the mixer unit of step (d); or
(10) partially into the part B composition during step (a) and partially directly into the mixer unit of step (d); or
(11) partially into the part B composition during step (b) and partially directly into the mixer unit of step (d); or
(12) partially into the part A composition, partially into the part B composition during step (a) and partially directly into the mixer unit of step (d); or
(13) partially into the part A composition and partially into the part B composition during step (a) and partially directly into the mixer unit of step (d); or
(14) partially into the part A composition, partially into the part B composition during step (b) and partially directly into the mixer unit of step (d); or
(15) partially into the part A composition and partially into the part B composition during step (b), and partially directly into the mixer unit of step (d).

9. The method as set forth in claim 1, wherein the composition is a two-part system comprising parts A and B, optionally wherein part B is free of component (iii).

10. The method as set forth in claim 1, wherein the part B composition comprises component (iii) and a reaction inhibitor.

11. The method as set forth in claim 1, wherein component (iv) has a boiling point of between 1° and 30° C., such that it undergoes a phase change from a liquid to a gaseous state during exposure to atmospheric pressure within this temperature range but is at least partially maintained in liquid form during step (d) or during steps (d) and (e).

12. A continuous method for forming a foamed silicone elastomer from a composition, the composition comprising:
(i) an organopolysiloxane having at least two silicon-bonded ethylenically unsaturated groups per molecule;
(ii) an organohydrogensiloxane having at least two silicon-bonded hydrogen atoms per molecule;
(iii) a hydrosilylation catalyst; and
(iv) a physical blowing agent comprising a hydrofluorocarbon (HFC);
wherein said method comprises the steps of:
(a) blending a part A composition comprising components (i) and (iii) and separately blending a part B composition comprising components (i) and (ii);
(b) introducing the part A composition and the Part B composition into respective mixing containers and mixing;
(c) transferring resulting part A and part B mixtures of step (b) into respective pumping means;
(d) pumping the resulting part A and part B mixtures of steps (b) and (c) into a mixer unit and mixing to form a foam in the mixer unit; and
(e) dispensing the resulting foam; and wherein
(f) component (iv) is introduced into one or both of the part A composition or the part B composition during step (a) or step (b) and/or is introduced into the mixer unit during step (d).

13. The method as set forth in claim 12, wherein one or more of steps (a) to (f) is undertaken while temperature and/or pressure controlled.

14. The method as set forth in claim 12, wherein no chemical blowing agent is used.

15. The method as set forth in claim 12, wherein component (iv) comprises 1,1,1,3,3-pentafluoropropane (HFC-245fa).

16. A continuous method for forming a foamed silicone elastomer from a composition, the composition comprising:
(i) an organopolysiloxane having at least two silicon-bonded ethylenically unsaturated groups per molecule;
(ii) an organohydrogensiloxane having at least two silicon-bonded hydrogen atoms per molecule;
(iii) a hydrosilylation catalyst; and
(iv) a physical blowing agent;

wherein said method comprises the steps of:

(a) blending a part A composition comprising components (i) and (iii) and separately blending a part B composition comprising components (i) and (ii);

(b) introducing the part A composition and the Part B composition into respective mixing containers and mixing;

(c) transferring resulting part A and part B mixtures of step (b) into respective pumping means;

(d) pumping the resulting part A and part B mixtures of steps (b) and (c) into a mixer unit and mixing to form a foam in the mixer unit; and (e) dispensing the resulting foam; wherein (f) component (iv) is introduced into one or both of the part A composition or the part B composition during step (a) or step (b) and/or is introduced into the mixer unit during step (d); and wherein the part B composition comprises component (iii) and a reaction inhibitor.

17. The method as set forth in claim 16, wherein one or more of steps (a) to (f) is undertaken while temperature and/or pressure controlled.

18. The method as set forth in claim 16, wherein no chemical blowing agent is used.

* * * * *